Nov. 12, 1946.  V. V. BLASUTTA  2,411,020
FLUID COMPRESSING APPARATUS
Filed Oct. 27, 1943  2 Sheets-Sheet 1

INVENTOR
Victor V. Blasutta
BY
*Warren H. F. Schmieding*
ATTORNEY

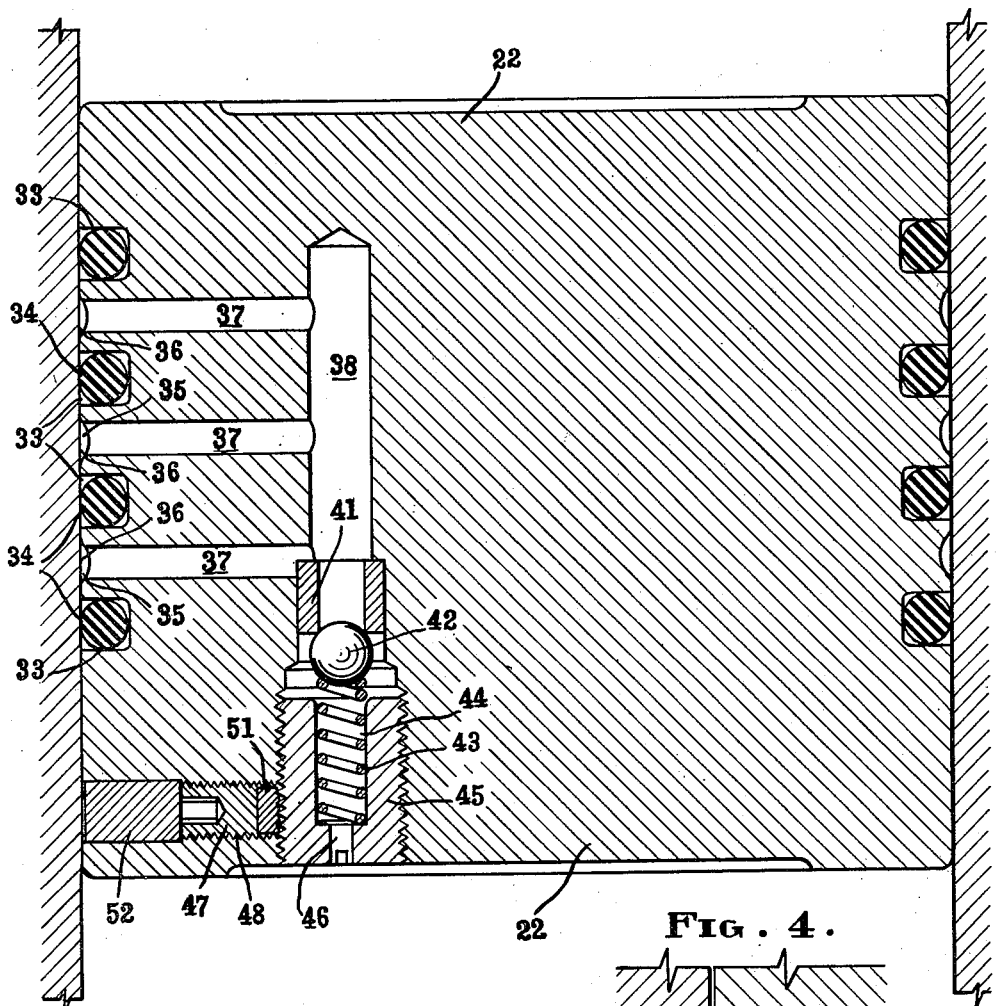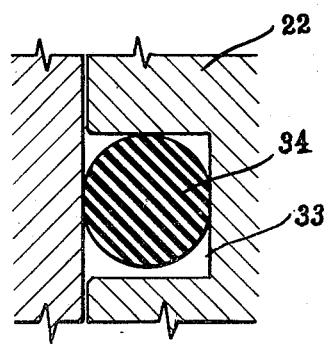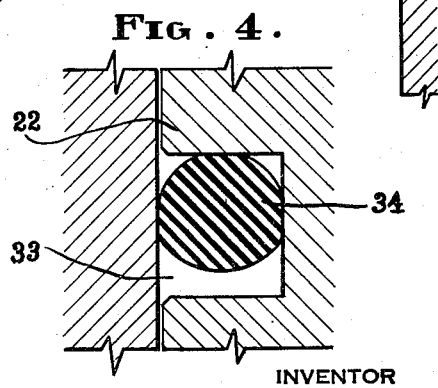

Patented Nov. 12, 1946

2,411,020

UNITED STATES PATENT OFFICE 2,411,020

FLUID COMPRESSING APPARATUS

Victor V. Blasutta, Columbus, Ohio, assignor to The Denison Engineering Company, Columbus, Ohio, a corporation of Ohio Application October 27, 1943, Serial No. 507,862

7 Claims. (Cl. 309—7)

This invention relates to pumping, compressing, and similar mechanical equipment in which cylinders containing movable pistons are employed.

In some equipment of this general type, cylinders and pistons are employed to create high differentials in pressure, for example, in certain hydraulic equipment, a piston is moved by a liquid under pressure to compress air for testing and other purposes. In such instances, the liquid, usually oil, seeps past the piston and becomes entrained in the compressed air causing faulty operation of some of the associated equipment.

An object of this invention resides in the provision of a piston so constructed as to prevent the seepage of fluid from one end thereof to the other.

Another object of the invention resides in the provision of a piston in which compressible sealing rings may be employed, the construction of the piston providing for maintaining pressure differentials on opposite ends of each of the sealing rings during the movement of the piston and to utilize the differential in pressure to force the rings into tight engagement with the adjacent walls of the cylinder and piston.

A further object resides in the provision of a piston having spaced ring-receiving grooves and a passage extending from one end of the piston to the outside surface of the piston between the grooves, check valve means being arranged in the passage to permit flow in one direction only through the passage.

It is also an object of the invention to provide a piston having a plurality of spaced ring-receiving grooves for the reception of sealing and wiping rings and valved passage means extending from one end of the piston to the outer surface thereof between adjacent rings to permit fluid which has escaped to the space between the rings, to return to the proper section of the chamber between strokes of the piston and thus decrease the possibility of the fluid escaping to the wrong end of the piston.

Further objects and advantages of the present invention will be apparent from the following description, reference being had to the accompanying drawings wherein a preferred form of embodiment of the invention is clearly shown.

In the drawings:

Fig. 2 is a detail vertical sectional view taken through the air compressing cylinder of the machine shown in Fig. 1, the plane of the section being indicated by the line 2—2 of Fig. 1;

Fig. 3 is an enlarged detail sectional view of a portion of a piston in a cylinder showing the sealing ring as it appears when no pressures are applied to the opposite ends; and Fig. 4 is a similar view showing the sealing ring as it appears when pressure differentials exist on opposite ends thereof.

Figure 1:
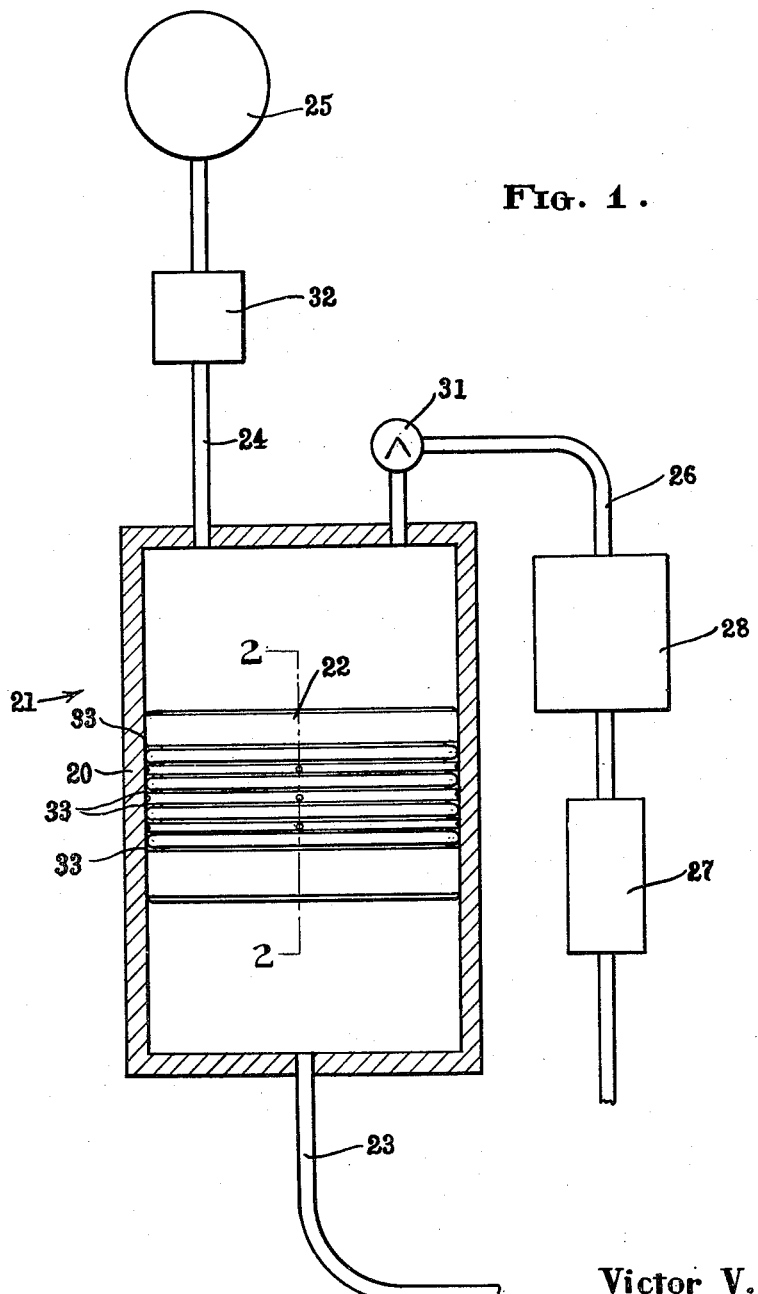
Fig. 1 is a diagrammatic view of a spark plug testing machine embodying the present invention.

Although the present invention is applicable to any type of pump or engine employing a piston, the same has been illustrated as applied to an air compressor.

Referring more particularly to the drawings, the numeral 20 designates the air compressing cylinder of a spark plug testing machine 21 which includes the compressing cylinder 20 in which piston 22 is disposed for longitudinal reciprocating movement. The lower end of the cylinder 20 has a conduit 23 communicating therewith, the conduit extending from a suitable source of hydraulic fluid under pressure. Normally, the piston 22 occupies the lower end of the cylinder 20 and the upper portion thereof is filled with air. When hydraulic fluid is forced into the cylinder 20 through the conduit 23, the piston is caused to move upwardly and compress air in the upper end of the cylinder 20. This compressed air is conducted by a pipe 24 to a chamber 25 where it is employed to raise the pressure in the chamber 25 in which the electrodes of a spark plug or plugs are positioned for test purposes. The pressure is built up in this manner to simulate actual working conditions in the testing operation.

To insure an accurate test, the electrodes must be clean and free from any foreign matter, therefore, to prevent the entrance of dirt, moisture or other undesirable substances, the air inlet tube 26 is provided with a filter 27 and a drier 28, these members being of any well known and satisfactory type. After the entering air has passed through the filter 27 and drier 28, it flows through a check valve 31 disposed in the inlet tube 26 adjacent the cylinder 20. The valve 31 may be of any conventional construction and is employed to prevent the air from escaping back through the tube 26 during the compression stroke of the piston 22. As the compressed air flows from the cylinder 20 to the testing chamber 25, it is further cleaned by passing through another filter 32 disposed in the pipe 24. This filter is of such type that it will remove hydraulic fluid as well as other materials from the air to prevent fouling of the spark plugs being tested.

To reduce the possibiltiy of hydraulic fluid becoming mixed with the air, the piston 22 has been constructed in accordance with the present invention. In this instance, the piston has been made of a plastic composition and has been formed to include a plurality of longitudinally spaced circumferential grooves 33. These grooves are formed for the reception of resilient sealing rings 34, preferably of a rubber composition, which have a substantially circular cross section. The grooves 33 are of a width sufficient to provide a limited degree of clearance above or below the rings when the piston is operatively positioned in the cylinder whereby proper sealing action will result when pressure differentials exist on opposite ends of the rings 34.

As shown in Fig. 3, the rings 34 are slightly compressed by the cylinder and piston walls when the piston and rings are under no pressure. When fluid under pressure is applied to one end of the piston, however, some of the fluid flows between the adjacent piston and cylinder walls and into the groove 33 where it acts upon the end of the ring 34 and forces it into firm engagement with one side wall of the groove 33. Due to this forcible engagement, the sides of the ring 34 will be expanded into fluid tight engagement with the cylinder and piston wall, as shown in Fig. 4 to prevent fluid from passing the piston. Due to faulty construction, prolonged periods of operation, wear and other causes, leakage sometimes develops and fluid escapes to the space between adjacent rings. The pressure of this fluid builds up until it is equal on opposite ends of the rings at which time the rings will not seal properly. The construction about to be described has been adopted to vent the space between the rings and avoid the accumulation of fluid therein.

Between adjacent grooves 33, the exterior wall of the piston is relieved as at 35 to provide annular spaces 36 between the piston and cylinder walls. Laterally extending branch passages 37 connect the spaces 36 with a trunk passage 38 which extends into the piston 22 from the lower end. Below the lowermost branch passage 37, the trunk passage 38 is provided with a valve seat 41 with which a ball valve 42 is normally adapted to engage, a compression spring 43 being employed to urge the ball 42 toward the seat 41. The spring 43 is disposed within the counterbored portion 44 of a plug 45 which is threaded into the lower end of the passage 38. An opening 46 extends through the lower end of the plug 45 to permit communication between the space in the cylinder 20 below the piston and the passage 38. Accidental removal of the plug 45 is precluded by a set screw 47 which is threaded into the side of the piston as at 48. This set screw 47 serves to press a relatively soft slug 51 against the threads of the plug 45 and thus prevent rotation thereof as well as injury to its threads. The set screw 47 is prevented from backing out of the piston and scoring the cylinder wall by a plug 52 formed from the same plastic material as the piston and inserted in the outer end of the hole for the set screw.

When the hydraulic fluid under pressure is introduced into the cylinder 20 beneath the piston 22, the fluid will engage the lowermost ring 34 and compress the same into sealing engagement with the walls of the cylinder and piston. The pressure of the fluid on the bottom of the piston 22 causes it to move upward and compress the air in the cylinder above the piston. During these compressing operations, the hydraulic fluid has a tendency to seep past the first ring and collect between the rings. It is essential for the proper operations of the sealing rings that pressure differentials exist on opposite sides thereof. It is, therefore, necessary to relieve the fluid which has entered the space between the rings, otherwise the pressure will build up until it substantially equals the pressure on the bottom of the piston. Due to the presence of the passages 37 and 38 and the fact that the fluid which has seeped past the rings is under pressure this fluid will flow out of the spaces between the rings when the fluid pressure below the piston is reduced to permit the piston to return to its normal position, the pressure of the fluid in the passages being sufficient to force valve 42 away from its seat against the force exerted by the light spring 43.

In the form of the invention illustrated, the piston is provided with four rings. The two intermediate rings serve as wipers to remove excess oil from the cylinder walls and return it to the body of the hydraulic fluid beneath the piston. It is obvious that more rings could be employed if desired or that the wiping rings could be omitted without seriously affecting the operation of the device.

While the form of embodiment of the present invention as herein disclosed constitutes a preferred form, it is to be understood that other forms might be adopted, all coming within the scope of the claims which follow.

I claim:

1. Fluid compressing apparatus comprising, in combination, a cylinder; a piston movable in said cylinder, said piston having three annular grooves in the outer side wall thereof; sealing means in the outermost grooves engaging the interior wall of the cylinder; wiping means in the intermediate groove engaging the interior wall of the cylinder; said piston forming passages extending to the side wall between adjacent grooves and forming a common passage connected with the first mentioned passages and leading to one end of the cylinder; and valve means in the common passage.

2. Fluid compressing apparatus comprising, in combination, a cylinder; a piston movable in said cylinder, said piston having a plurality of annular grooves in the outer side wall thereof; sealing means in the outermost grooves and engaging the inner wall of said cylinder; wiping means in an intermediate groove for engaging the inner wall of said cylinder; said piston having passages extending to the side wall between adjacent grooves and a common passage connected with the first-mentioned passages and leading to one end of the cylinder; and valve means in the common passage between the end of the piston and the point of connection of the first passage therewith.

3. A piston comprising, in combination, a cylindrical body having one end for compressing a fluid and the other end for engagement by a motivating force, said body having longitudinally spaced annular grooves formed in the outer side wall thereof; compressible sealing rings disposed in said grooves; said body having passage means extending from the outer side wall between said rings to the end formed for engagement by the motivating force; and valve means in said passage for preventing fluid flow into said passage from said last-mentioned end of said piston.

4. A piston comprising, in combination, a cylindrical body having one end for compressing a fluid and the other end for engagement by a motivating force, said body having longitudinally spaced annular grooves formed in the outer side wall thereof; endless rubber-like rings having circular cross sections disposed in said grooves, said body having passage means extending from the outer side wall between said rings to the end formed for engagement by the motivating force; and valve means in said passage for preventing fluid flow into said passage from said last-mentioned end of said piston.

5. Piston means in a cylinder formed for the reception of a substantially non-compressible fluid under pressure at one end to effect the compression of another fluid at the opposite end comprising a body having a plurality of grooves in the outer side wall thereof; compressible sealing rings disposed in said grooves; a passage extending into said body from the end exposed to the non-compressible fluid; a branch passage extending from said first-mentioned passage to the outer side wall between said grooves; and, a check valve in said first passage to permit fluid flow only from between said grooves to the end of the cylinder receiving said non-compressible fluid.

6. Piston means in a cylinder formed for the reception of a fluid under pressure at one end to effect the compression of another fluid at the opposite end comprising a body having a plurality of grooves in the outer side wall thereof; compressible sealing rings disposed in said grooves; passage means extending into said piston from the end exposed to the fluid pressure and terminating at the outer side wall between said rings; and, check valve means in said passage means, said valve means permitting fluid flow only in the direction from between said rings to the end of the cylinder receiving the fluid pressure.

7. A piston in a cylinder formed to receive a motivating fluid in one end to compress a fluid in the other end comprising a body having spaced grooves in the outer side wall thereof; compressible sealing rings disposed in said grooves; a passage in said body extending from the end exposed to said motivating fluid to the space between said grooves; and valve means for preventing the flow of motivating fluid into said passage from the end of the cylinder receiving the same.

VICTOR V. BLASUTTA.